United States Patent Office 2,972,832
Patented Feb. 28, 1961

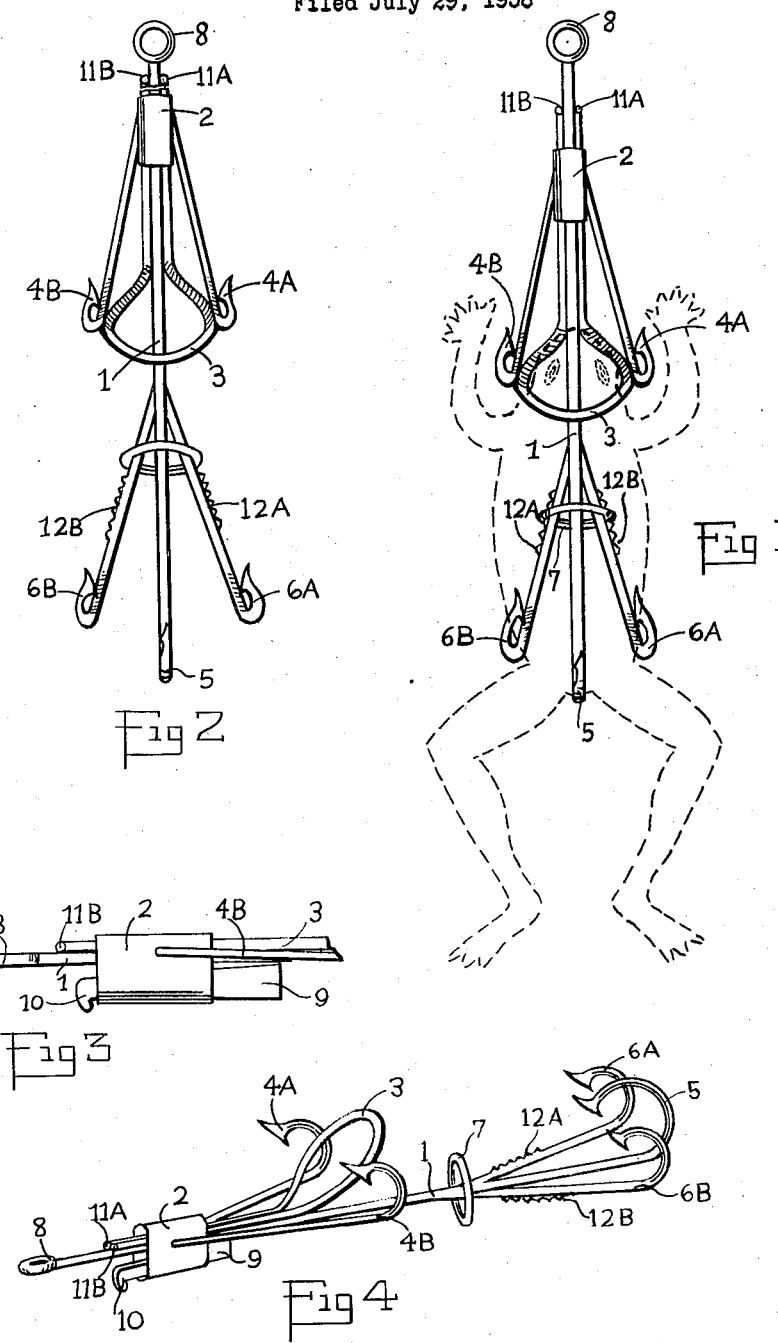

2,972,832

LIVE BAIT HOLDER

James V. Anselmi, 16 Essex St., Deep River, Conn.

Filed July 29, 1958, Ser. No. 752,162

7 Claims. (Cl. 43—44.4)

This invention relates to fishing lures and more particularly to fish bait holders of the type adapted to hold live bait in proximity to fish hooks without penetration of the bait.

The advantages of live bait for certain piscatological purposes is well established and acknowledged by most fishermen. However, live bait holders of the type presently known involve such disadvantages as to discourage their use. Many of these devices fail to hold the bait securely and it is lost in the cast; others are so complicated or awkwardly arranged that much effort and handling of the bait is necessary to secure the bait in place. But even when these problems are minimized, the devices are still limited in use, because they are designed for a particular size of bait and can be effectively used only with that size. When using live bait, such as frogs, polliwogs, grasshoppers, crabs, etc., an efficient bait holder must be capable of adjusting to accommodate a variety of sizes, as each of the various frogs, polliwogs, grasshoppers, crabs, etc. used will be of a slightly different size.

It is, therefore, an object of the present invention to provide an improved live bait holder that is capable of adjustment to accommodate various sizes of bait.

It is another object of this invention to provide such an adjustable live bait holder, which will hold the bait securely without penetrating or in any way injuring the bait.

It is a further object of this invention to provide such an adjustable live bait holder, which may be applied to the bait with a minimum of effort, yet hold the bait securely but allow for free movement of the bait's various appendages.

It is a further object of this invention to provide such an adjustable live bait holder with simplicity of construction and inexpensiveness in manufacture.

Further and other objects will become apparent from the following specification in which like numerals refer to like parts.

In the drawings:

Fig. 1 is a plan view showing the bait such as a frog in dotted or broken lines.

Fig. 2 is a plan view of the live bait holder.

Fig. 3 is an enlarged fragmentary view.

Fig. 4 is a perspective view.

The shank 1 is provided at its extreme forward end with an eyelet 8 to which a suitable line can be attached. From the other end of the shank 1, and attached thereto, extends the crotch hook 5, and side hooks 6A and 6B. The crotch hook 5 extends on the same plane and in the same direction as the shank 1. The side hooks 6A and 6B extend on the same plane but at five to ten degree angles away from opposite sides of the shank 1. The outer opposite sides of the side hooks 6A and 6B are provided with rows of teeth 12A and 12B.

It will be understood from reference to Fig. 1 of the drawings that when the bait, illustrated as a frog in this preferred embodiment, is placed stomach down, resting upon the shank 1 and the shank portions of hooks 5, 6A and 6B, that the hook portion of crotch hook 5 will grip the bait around the crotch formed between its legs and the side hooks 6A and 6B being slightly less extended than crotch hook 5, are positioned against the bait's opposite sides. A ring 7 encircles the shank portions of the hooks 5, 6A and 6B and has an inner diameter slightly shorter than the distance between the rows of teeth 12A and 12B. The bait is placed on the live bait holder while it is in the position shown in Fig. 2. The ring 7 is then forced manually toward the hook portions of the hooks 5, 6A and 6B until the side hooks 6A and 6B, being slightly resilient, are pressed in tightly against the bait's sides. The rows of teeth 12A and 12B retain the ring 7 in this position until the side hooks are manually pressed further together and the ring is released.

Toward the forward end of the shank 1, a harness assembly is provided, consisting of a slidable collar 2, a harness 3, side hooks 4A and 4B and a lock wedge 9. The harness 3, made of some suitable rigid material such as a metal, has a loop portion extending toward the rearward end of and upwardly from the shank 1 and two elongated end portions extending parallel to and toward the forward end of the shank 1. The slidable collar 2 surrounds the shank 1 and the elongated end portions of the harness 3. A lock wedge 9 is provided within the slidable collar 2 and beneath the shank 1. The lock wedge 9, as shown in Figs. 3 and 4, is tapered so as to be thicker at its rearward end and provided at its forward end with a gripping portion 10. The two elongated end portions of the harness 3 are provided with knobs 11A and 11B. The head-side hooks 4A and 4B are attached to and extend rearwardly from the slidable collar 2, at an outward angle of five to ten degrees.

When the bait is placed in the harness, its head rests upon the shank 1 and is in registry with the loop portion of harness 3, which may be manually moved rearwardly until it encircles the bait's head as shown in Fig. 1. The harness 3 moves independently of the slidable collar 2, so that head-side hooks 4A and 4B do not interfere with getting the bait's head properly positioned within the loop portions of harness 3. The knobs 11A and 11B keep slidable collar 2 from passing over the ends of harness 3, accidently releasing it from position.

When the bait's head is properly encircled by the loop portion of harness 3, the slidable collar 2 is then moved rearwardly until the head side hooks 4A and 4B are properly positioned adjacent opposite sides of the bait's head, as illustrated in Fig. 1. When both the harness 3 and the slidable collar 2 have been moved into the desired position, the thicker end of wedge lock 9 is forced further into the slidable collar 2, until by the resultant wedging action, the entire harness assembly is held securely in position. To release the harness assembly from this position, the narrower end of the lock wedge 9 is forced further into the slidable collar 2. A gripping portion 10 is provided on the narrower end of lock wedge 9 to facilitate moving it into and out of locking position.

It will be understood from the foregoing description of this preferred embodiment of the invention that since the side hooks 6A and 6B, as well as the harness assembly, can be adjusted to a variety of positions, frogs of varying sizes can be used in this live bait harness. It will also be understood that with such minor variations in shapes and sizes, as will be obvious to those skilled in the art, this live bait holder can be made applicable to other bait such as polliwogs, grasshoppers, crabs, etc. Other modifications within the spirit of the invention may occur to those skilled in the art, and therefore it is intended that no limitations be placed on the invention except as defined by the scope of the appended claims.

What is claimed is:

1. A live bait holder comprising, means for attaching a line thereto, a shank, a crotch hook attached to the rearward end of said shank and extending rearwardly therefrom, at least one side hook attached to each side of said shank near the rearward end of said shank and extending rearwardly therefrom and biased outwardly therefrom at an angle less than 90° away from said shank, means to force said side hook toward one another and retain said side hooks so forced in a substantially fixed position, and a harnessing means mounted on said shank toward the forward end of said shank opposite said crotch hook.

2. A live bait holder comprising, means for attaching a line thereto, a shank, at least one side hook attached to each side of said shank near the rearward end of said shank and extending rearwardly therefrom and biased outwardly therefrom at an angle less than 90° away from said shank, a freely slidable ring surrounding said side hooks at a point near their attachment to said shank so that rearward movement of said ring forces said side hooks toward one another, and means to retain said ring so moved in a substantially fixed position, and a harnessing means mounted on said shank toward the forward end of said shank opposite said side hooks.

3. A live bait holder comprising, means for attaching a line thereto, a shank, at least one side hook attached to each side of said shank near the rearward end of said shank and extending rearwardly therefrom and biased outwardly therefrom at an angle less than 90° away from said shank, a freely slidable ring surrounding said side hooks at a point near their attachment to said shank so that rearward movement of said ring forces said side hooks toward one another, means to retain said ring so moved in a substantially fixed position, a harnessing means slidably mounted on said shank toward the forward end of said shank opposite said side hooks, and means to lock said harnessing means in a substantially fixed position.

4. A live bait holder comprising, means for attaching a line thereto, a shank, at least one side hook attached to each side of said shank near the rearward end of said shank and extending rearwardly therefrom and biased outwardly therefrom at an angle less than 90° away from said shank, a freely slidable ring surrounding said side hooks at a point near their attachment to said shank so that rearward movement of said ring forces said side hooks toward one another, means to retain said ring so moved in a substantially fixed position, and a harnessing means slidably mounted on said shank opposite said side hooks, said harnessing means including a substantially rigid loop extending at an upward angle from said shank and means to lock said harnessing means in a substantially fixed position.

5. A live bait holder comprising a shank, means for attaching a line to the forward end of said shank, a crotch hook attached to the rearward end of said shank and extending rearwardly therefrom, at least one side hook attached to each side of said shank near the rearward end of said shank and extending rearwardly therefrom and biased outwardly therefrom at an angle less than 90° away from said crotch hook, a freely slidable ring surrounding said side hooks and said crotch hook at a point near their attachment to said shank so that rearward movement of said ring forces said side hooks toward one another, means to retain said ring so moved in a substantially fixed position, a harnessing means slidably mounted on said shank toward the forward end of said shank opposite said crotch hook and means to lock said harnessing means in a substantially fixed position.

6. A live bait holder comprising a shank, means for attaching a line to the forward end of said shank, a crotch hook attached to the rearward end of said shank and extending rearwardly therefrom, at least one side hook attached to each side of said shank near the rearward end of said shank and extending rearwardly therefrom and biased outwardly therefrom at an angle less than 90° away from said crotch hook, a freely slidable ring surrounding said side hooks and said crotch hook at a point near their attachment to said shank so that rearward movement of said ring forces said side hooks toward one another, means to retain said ring so moved in a substantially fixed position, a harnessing means slidably mounted on said shank toward the forward end of said shank opposite said crotch hook, and said harnessing means including a substantially rigid loop extending at an upward angle from said shank and means to lock said harnessing means in a substantially fixed position.

7. A live bait holder comprising, a shank, an eyelet formed in the forward end of said shank, a crotch hook attached to the rearward end of said shank and extending rearwardly therefrom, at least one side hook attached to each side of said shank near the rearward end of said shank and extending rearwardly therefrom and biased outwardly therefrom at an angle less than 90° away from said crotch hook, a freely slidable ring surrounding said side hooks and said crotch hook at a point near their attachment to said shank so that rearward movement of said ring away forces said side hooks toward one another and means to retain said ring so moved in a substantially fixed position, a harnessing means slidably mounted on said shank toward the forward end of said shank, said harnessing means comprising a substantially rigid loop extending at an upward angle from said shank and having elongated end portions extending immediately adjacent and parallel to said shank toward said eyelet, a collar slidably mounted on said shank and encircling said shank and said elongated end portions of said rigid loop, headside hooks attached to and extending from said slidable collar toward said rigid loop and substantially adjacent thereto, and a tapered lock wedge positioned partially within said slidable collar so that movement of the thicker portion of said lock wedge further into said slidable collar locks said slidable collar in a substantially fixed position and retains said harnessing means in a substantially fixed position.

References Cited in the file of this patent

UNITED STATES PATENTS

| 914,478 | Bradley et al. | Mar. 9, 1909 |
| 990,095 | Balcom | Apr. 18, 1911 |
| 1,386,061 | Johnson | Aug. 2, 1921 |
| 1,613,113 | Leu | Jan. 4, 1927 |

FOREIGN PATENTS

| 4,879 | Great Britain | 1896 |
| 16,438 | Great Britain | 1908 |